United States Patent
Schmitt et al.

(10) Patent No.: US 10,503,950 B2
(45) Date of Patent: Dec. 10, 2019

(54) METHOD AND SYSTEM FOR BEAM CONTROL IN BIOMETRIC SENSING

(71) Applicant: SONAVATION, INC., Palm Beach Gardens, FL (US)

(72) Inventors: Rainer M. Schmitt, Palm Beach Gardens, FL (US); Ronald A. Craig, Boynton Beach, FL (US)

(73) Assignee: SONAVATION, INC., Palm Beach Gardens, FL (US)

( * ) Notice: Subject to any disclaimer, the term of this patent is extended or adjusted under 35 U.S.C. 154(b) by 0 days.

(21) Appl. No.: 16/385,413

(22) Filed: Apr. 16, 2019

(65) Prior Publication Data

US 2019/0244001 A1 Aug. 8, 2019

Related U.S. Application Data

(63) Continuation of application No. 16/245,299, filed on Jan. 11, 2019, which is a continuation of application No. 15/470,465, filed on Mar. 27, 2017, now abandoned, which is a continuation of application No. 14/174,761, filed on Feb. 6, 2014, now Pat. No. 9,607,206.

(60) Provisional application No. 61/761,665, filed on Feb. 6, 2013.

(51) Int. Cl.
 *G06K 9/00* (2006.01)

(52) U.S. Cl.
 CPC ......... *G06K 9/0002* (2013.01); *G06K 9/0008* (2013.01); *G06K 9/00201* (2013.01); *G06K 9/00885* (2013.01); *G06K 2009/00932* (2013.01)

(58) Field of Classification Search
 CPC ............ G06K 9/0008; G06K 9/00201; G06K 9/00885
 See application file for complete search history.

(56) References Cited

U.S. PATENT DOCUMENTS

| | | |
|---|---|---|
| 6,280,387 B1 | 8/2001 | Deforge et al. |
| 6,640,636 B1 | 11/2003 | Toda |
| 6,720,712 B2 | 4/2004 | Scott |
| 7,141,918 B2 | 11/2006 | Scott |
| 7,489,066 B2 | 2/2009 | Scott et al. |
| 7,514,842 B2 | 4/2009 | Scott |
| 7,796,013 B2 | 9/2010 | Murakami et al. |
| 7,844,660 B2 | 11/2010 | Henry et al. |

(Continued)

FOREIGN PATENT DOCUMENTS

| | | |
|---|---|---|
| JP | 2002175529 A | 6/2002 |
| JP | 2003263640 A | 9/2003 |

(Continued)

OTHER PUBLICATIONS

Office Action dated Jun. 19, 2018 in U.S. Appl. No. 15/299,202.

(Continued)

*Primary Examiner* — Edward Park
(74) *Attorney, Agent, or Firm* — Pillsbury Winthrop Shaw Pittman LLP

(57) ABSTRACT

A system, apparatus and method for obtaining biometric data from characteristics of a fingerprint and obtaining characteristics of subcutaneous structures that are embedded within finger tissue and located in relation to the fingerprint.

15 Claims, 11 Drawing Sheets

(56) References Cited

U.S. PATENT DOCUMENTS

| | | | |
|---|---|---|---|
| 8,331,633 | B2 | 12/2012 | Schmitt |
| 8,335,356 | B2 | 12/2012 | Schmitt |
| 9,607,206 | B2 | 3/2017 | Schmitt |
| 9,841,318 | B1 | 12/2017 | Schmitt |
| 2002/0138768 | A1* | 9/2002 | Murakami ............... G06K 9/00 726/5 |
| 2003/0216646 | A1 | 11/2003 | Angelsen |
| 2005/0174015 | A1 | 8/2005 | Scott |
| 2005/0225212 | A1 | 10/2005 | Scott |
| 2006/0241468 | A1 | 10/2006 | Lu |
| 2007/0043295 | A1 | 2/2007 | Chomas et al. |
| 2007/0046149 | A1 | 3/2007 | Zipparo |
| 2007/0132342 | A1* | 6/2007 | Scott .................... G06K 9/0002 310/338 |
| 2010/0066207 | A1 | 3/2010 | Saito |
| 2010/0113952 | A1 | 5/2010 | Raguin et al. |
| 2013/0202170 | A1 | 8/2013 | Blezek et al. |
| 2014/0151439 | A1 | 6/2014 | Hesse |
| 2015/0016223 | A1 | 1/2015 | Dickinson |
| 2015/0190114 | A1 | 7/2015 | Ninomiya |
| 2016/0058417 | A1 | 3/2016 | Kiyose |

FOREIGN PATENT DOCUMENTS

| | | | |
|---|---|---|---|
| WO | 0171648 | A2 | 9/2001 |
| WO | 02084602 | A1 | 10/2002 |
| WO | WO 02/084602 | A1 * | 10/2002 |
| WO | 2012020591 | A1 | 2/2012 |

OTHER PUBLICATIONS

Office Action dated May 27, 2016 in U.S. Appl. No. 14/174,761.
Office Action dated Oct. 27, 2015 in U.S. Appl. No. 14/174,761.
C.E. Demore et al., Real Time Volume Imaging Using a Crossed Electrode Array, IEEE UFFC Trans vol. 56 ( 6), pp. 1252-1261.
J.A. Jensen, Estimation of Blood Flow using Ultrasound, Cambridge University Press, 1996.
R.S.C. Cobbold, Foundations of Biomedical Ultrasound, Oxford University Press, 2007.
Office Action dated Apr. 18, 2019 in U.S. Appl. No. 16/056,304.
Office Action dated Apr. 26, 2019 in Chinese Application 201480011088.5.
Office Action dated Jul. 30, 2019 in U.S. Appl. No 16/245,299.
Office Action dated Aug. 5, 2019 in U.S. Appl. No 16/385,437.
Office Action dated Aug. 7, 2019 in U.S. Appl. No 16/385,339.

* cited by examiner

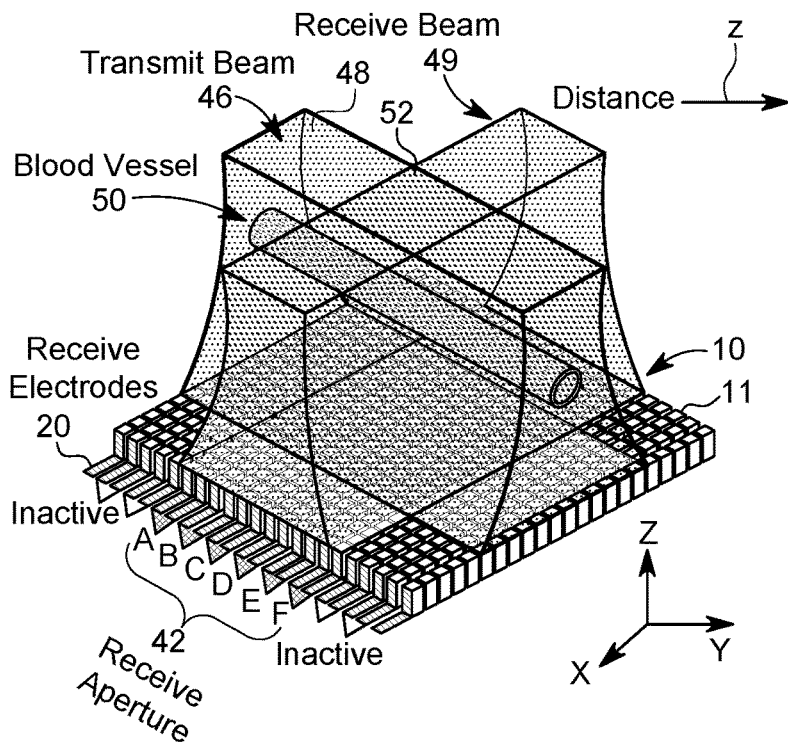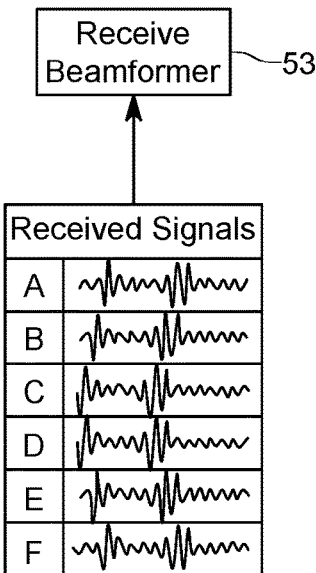
FIG. 7A  FIG. 7B
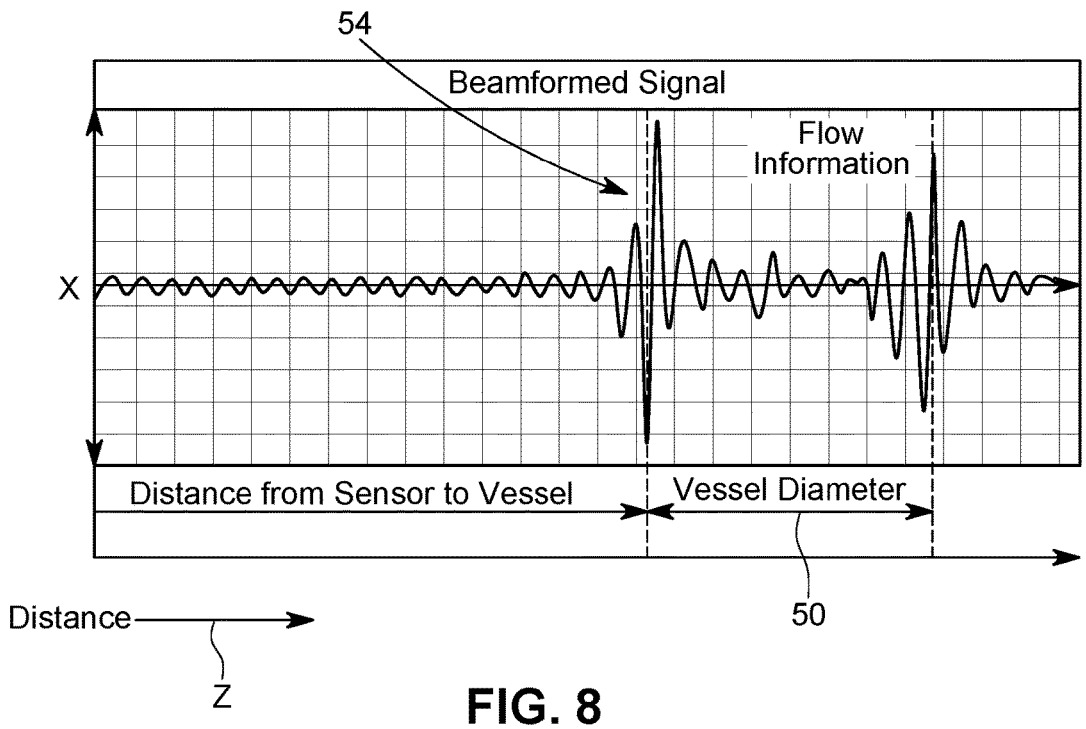
FIG. 8

METHOD AND SYSTEM FOR BEAM CONTROL IN BIOMETRIC SENSING

CROSS-REFERENCE TO RELATED PATENT APPLICATIONS

The present application is a continuation of U.S. patent application Ser. No. 16/245,299, filed Jan. 11, 2019, which is a continuation of U.S. patent application Ser. No. 15/470,465 filed Mar. 27, 2017, which is a continuation of U.S. patent application Ser. No. 14/174,761 filed Feb. 6, 2014 (now U.S. Pat. No. 9,607,206 issued Mar. 28, 2017), which claims benefit of U.S. Provisional Patent Application 61/761,665 filed Feb. 6, 2013, all of which are incorporated herein by reference in their entirety.

BACKGROUND OF THE INVENTION

Fingerprinting is one of the most widely used biometric for human identification. Identification is obtained by analyzing a given fingerprint image obtained by a fingerprint sensor for the relative locations and orientations of structural elements such as branching or ending of ridges and valleys known as minutia. These characteristics are obtained in the enrollment mode of a person's finger or multiple fingers. In the verification mode a second fingerprint is obtained and analyzed for similarity based on minutia or other previously defined fingerprint characteristics. This minutia is also referred to herein as a type of biometric marker.

The probability for false identification either a false acceptance or false rejection depends on the number of minutia identified in the fingerprint. The number of minutia increases with the fingertip area being scanned. However, for integration of fingerprint sensors into mobile devices for access control, such as cell phone a small area fingerprint sensor is very desirable.

Sonavation, Inc. of Palm Beach Gardens, Fla., USA manufactures biometric sensing devices having a ceramic Micro-Electro Mechanical System (MEMS) piezoelectric array that is made from a ceramic composite material. When this piezoelectric material is formed into a pillar 1/10th the diameter of a human hair, it has a unique set of properties that enable it to mechanically oscillate when an electric field is applied or create an electrical voltage when mechanically vibrated. The piezoelectric pillar is electrically vibrated at its natural ultrasonic resonant frequency. If a fingerprint ridge is directly above the pillar, much of the ultrasonic energy is absorbed by the skin and the signal impedance of the pillar is very high. If a valley is directly above the pillar, very little energy is absorbed and the impedance is very low. By arranging the pillars in a matrix of several thousand elements a two-dimensional image of a fingerprint can be created. An imaging ASIC electrically controls the pillar oscillation, imaging of the fingerprint and data management of the fingerprint information.

U.S. Pat. No. 7,141,918 describes an biometric sensing device having the above piezoelectric array operable for fingerprint imaging. It has been found as also described in this patent that the piezoelectric array can be operated in non-fingerprint imaging modes to obtain other biometric information, such as in an echo mode to provide imaging, such as bone, or a Doppler-shift mode to detect blood flow velocity and blood flow patterns. Although the sensor described in this patent is useful, it would be desirable to also operate the sensing device in a three-dimension ultrasound imaging mode to provide improved imaging of subcutaneous structures for use in biometric identification (or medical applications) that does not rely on echo mode imaging as described in U.S. Pat. No. 7,141,918.

The discussion above is merely provided for general background information and is not intended to be used as an aid in determining the scope of the claimed subject matter.

BRIEF DESCRIPTION OF THE INVENTION

Accordingly, it is an object of the present invention to provide a biometric sensing device having a piezoelectric array providing improved three-dimension imaging of subcutaneous tissue structures of a finger, such as bone or vasculature, utilizing pitch/catch ultrasonically formed images.

It is another object of the present invention to provide a biometric sensing device having a piezoelectric sensor array providing improved three-dimension images of subcutaneous tissue structures of a finger where such images are useful for further providing proof of life parameters.

Briefly described, the present invention embodies a biometric sensing device having an array of piezoelectric ceramic elements operable in a first mode for producing first data representative of a fingerprint image, and a second mode for producing second data representative of least one three-dimensional image of subcutaneous tissue structure(s), such as or bone or vascular, formed by pitch-n-catch ultrasound imaging. The images provided from operating the sensing device in the first and second modes provide anatomical and morphological biometrics (biometric data) for use in biometric identification.

The second data representative of least one three-dimensional image of subcutaneous tissue structure, may also be used for determining elastic properties of tissue, and vital or proof of life parameters, i.e. physiological information, such as heart beat, blood flow velocities, and pulse wave pattern, or other parameters which can be used to determine if the finger disposed upon the sensor array is fake or dead.

The elastic properties of tissue which may, like captured fingerprint image and the one or more images of subcutaneous tissue structure(s), provide biometrics (biometric data) for use in biometric identification. Thus, multiple types of biometric data can obtained with a single application of a finger to the sensor array, which can be done in real time and simultaneously.

The architecture of the identification device is similar to what is described in U.S. Pat. No. 7,141,918, also referred to herein as the '918 patent. Embodiments of the subject invention include various improvements over the '918 patent that are described herein. These improvements include those relating to electronic control and data acquisition. U.S. Pat. No. 7,141,918 is incorporated herein by reference. Further, U.S. Pat. Nos. 7,844,660, and 6,720,712, which are related to U.S. Pat. No. 7,141,918 are also incorporated herein by reference.

This brief description of the invention is intended only to provide a brief overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention can encompass other equally effective embodiments.

The drawings are not necessarily to scale. The emphasis of the drawings is generally being placed upon illustrating the features of certain embodiments of the invention. In the drawings, like numerals are used to indicate like parts throughout the various views. Differences between like parts may cause those parts to be indicated with different numerals. Unlike parts are indicated with different numerals. Thus, for further understanding of the invention, reference can be made to the following detailed description, read in connection with the drawings in which:

FIG. 7A illustrates a receive aperture 42 selected by processor 13 to receive acoustic energy (beam or pulse 49). FIG. 7B illustrates transmit signals received via channels A-F.

FIG. 8 illustrates a combined output signal 54.

DETAILED DESCRIPTION OF THE INVENTION

Figure 1A:
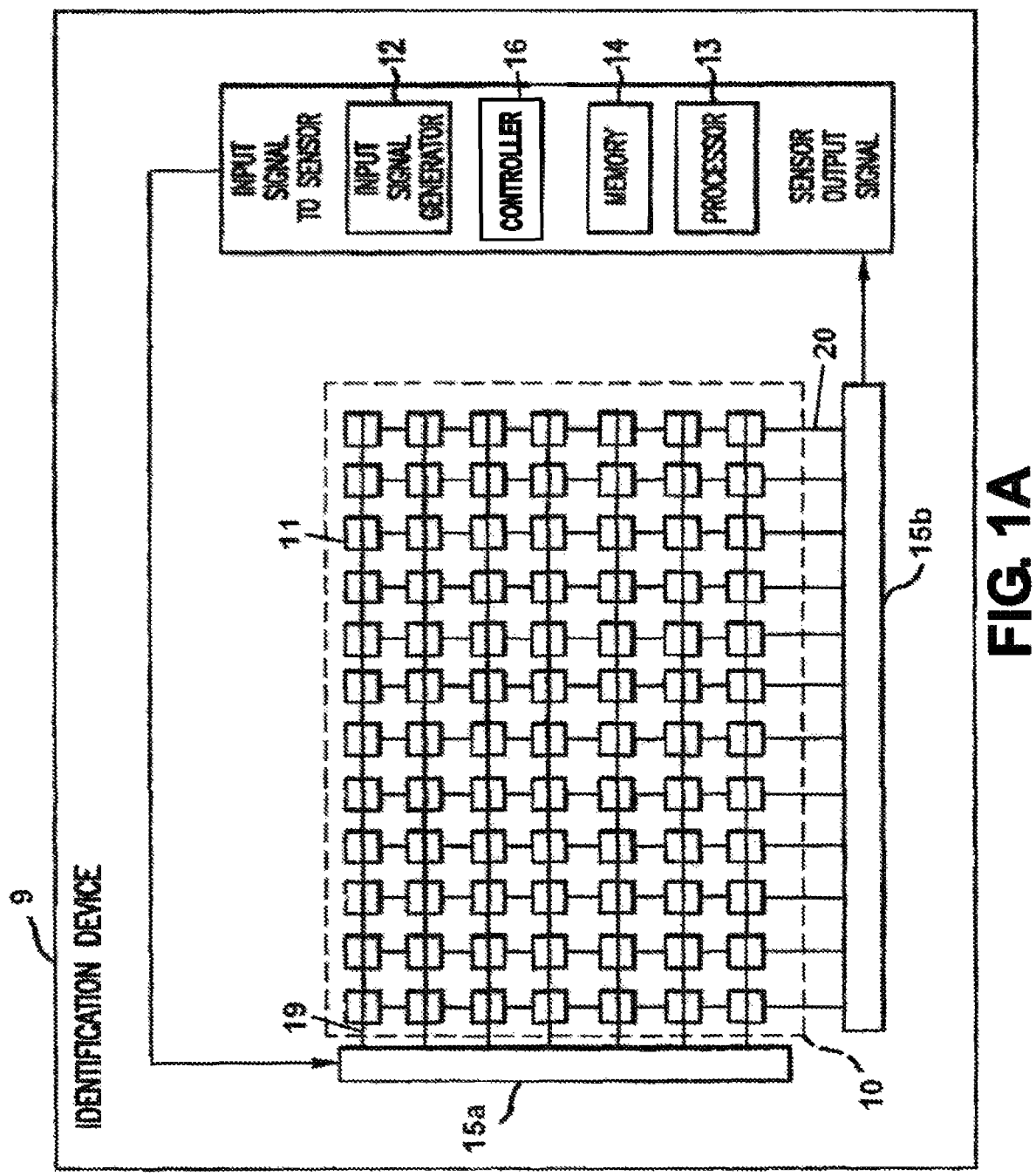
FIG. 1A is a schematic diagram of a top down view of a piezoelectric identification device according to the present invention.

Referring to FIG. 1A, a schematic diagram of a the piezoelectric identification device 9 according to the present invention is shown. Identification device 9 has a sensor array 10 of piezo-electric elements 11 providing mechanical resonator sensing, a sensor input signal generator 12, and a processor 13. Under control of processor 13, the input signal generated by input signal generator 12 is coupled to sensor array 10 by a signal multiplexer 15a, and output signal of sensor 10 is coupled to processor 13 by a multiplexer 15b.

Processor 13 processes the output signals from select element(s) via multiplexor 15b to obtain biometric data which may then be stored in a memory 14. Biometric data can include one or more fingerprint images, and/or one or more ultrasound images of subcutaneous structures of the finger, subcutaneous tissue parameter(s) such as of tissue elasticity, and/or detected proof of life parameters, as described later below. Addressing of elements 11, via multiplexers 15a and 15b, is enabled via a mux controller 16 in accordance with user specified imaging modes and/or in detection of proof of life parameters. Although each multiplexor 15a and 15b is shown singularly, each multiplexor's function may alternatively be designed to be provided by two or more multiplexors as desired.

Figure 2:
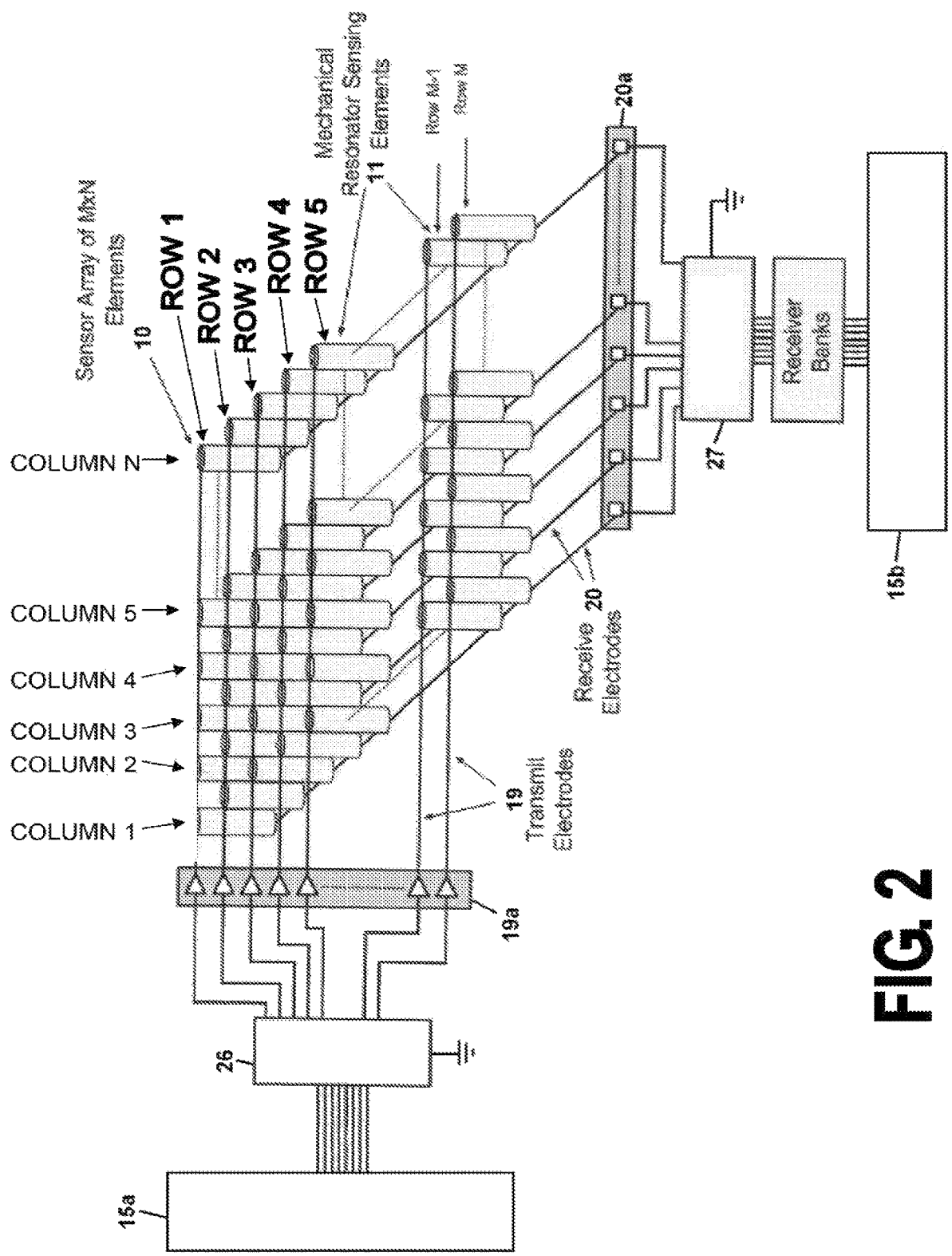
FIG. 2 a schematic illustration of the sensor array addressing scheme is shown, where there are M and N number of elements 11, disposed in M rows along an x axis and in N columns along a y axis.

Sensor array elements 11 may be of lead zirconate titanate (PZT) or other material having similar properties, preferably, PZT 1-3 composite. The piezo-ceramic elements 11 can have shapes other than rectangular, such as circular as shown in FIG. 2. Sensor area 10 is preferably provided on a support layer, such as described in the above incorporated patent. Other ASIC chips may provide the electronics shown in FIG. 1A to which the sensor is connected.

Figure 1B:
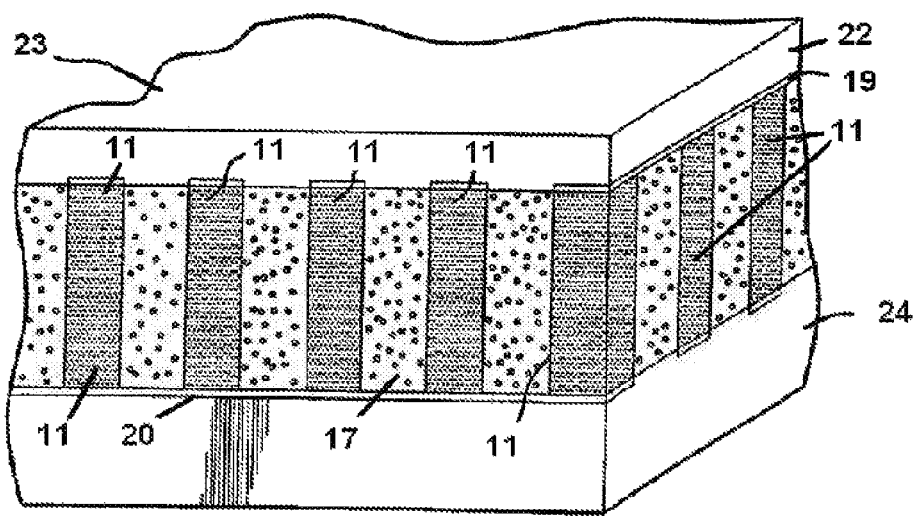
FIG. 1B is a side perspective view of the piezoelectric identification device in which pillars (elements) are evenly spaced and are separated by filler material.

A more detailed view of sensor array 10 is shown in FIG. 1B in which elements 11 represent evenly spaced pillars with filler material 17 there between. Filler material 17 may be an epoxy or polymer having micro-spheres. Transmit electrodes (or lines) 19 and receive electrodes (or lines) 20 (See FIG. 1A) are provided above and below, respectively, along sensor array 10. Over the transmit electrodes 19 is a shield or protective coating layer 22, such as urethane providing a surface 23 upon which a fingertip may be placed. Below the receive electrodes 20 is a support substrate 24, such as of foam material.

Referring to FIG. 2, a schematic illustration of the addressing scheme is shown, where there are M by N number of elements 11, disposed in M rows along a horizontal x axis as shown and in N columns along a vertical y axis as shown. For example; M and N may equal 368 and 256, respectively, but another number of elements, and row and column grouping thereof, can be employed in accordance with other embodiments of the invention. Transmit electrodes 19 are parallel conductors that connect to the top of elements 11 in rows 1 to M, while receive electrodes 20 are parallel conductors that connect to bottom of elements 11 in columns 1 to N. In accordance with some embodiments, each element 11 is 40 microns square by 100 microns deep, thereby yielding a dense sensor array 10 having a 20 MHz fundamental frequency sonic wave elements 11. A spacing of 10 microns is used between elements 11 and is preferred in order to provide a 50-micron total pitch between elements. Other geometries may be used, such as for example, a pitch of greater or lower than 50 microns. For example, a sensor with 368 rows and 256 columns may be 18.7 by 13 mm, or other size according to the maximum imaging size desired for the particular application.

In some embodiments, sensor array 10 may be manufactured as described in U.S. Pat. No. 7,489,066, which is herein incorporated by reference. By arrangement of the elements in an array of rows and columns, elements 11 are individually addressable for application of an input signal by row, and then addressable for reading out an output signal by column, by selection of electrodes 19 and 20, via multiplexors 15a and 15b, respectively.

A ground switch 26 is provided coupled to all transmit electrodes 19 between edge connector 19a and multiplexor 15a enabling processor 13 to connect electrodes 19 to ground when needed. Similarly, a ground switch 27 is provided coupled to all receive electrodes 20 between edge connector 20a and multiplexor 15b enabling processor 13 enabling processor 13 to connect electrodes 20 to ground when needed. The benefit of ground switches 26 and 27 is that it avoids additional switching of ground and signal electrodes as described in U.S. Pat. No. 7,141,918, thereby avoiding unwanted additional capacitive loads parallel to the transmitting and receiving elements 11.

As will be described below, processor 13 is programmed within its embedded memory (or memory 14) to enable all sensing operations by sensor array 10 as described herein, including at least fingerprint imaging, and three-dimensional ultrasound imaging. Further, processor 13 may provide other activities commonly implemented in an ultrasonic imaging system as part of electronic beam formation including synthetic aperture imaging.

Figure 3:
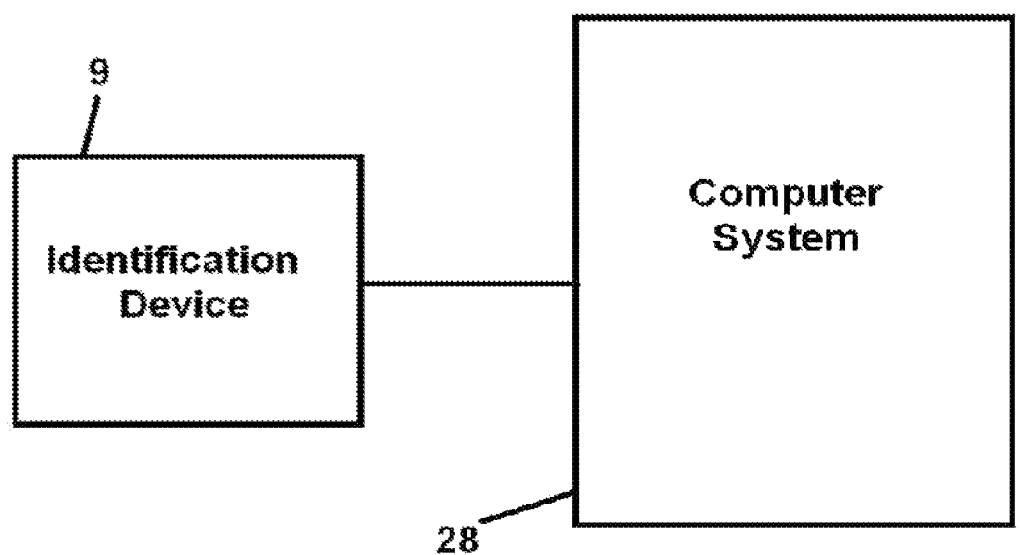
FIG. 3 illustrates an identification device that is coupled to a computer system.

Referring to FIG. 3, identification device 9 is coupled to a computer system 28 for data communication to send commands and receive biometric data from identification device 9. Computer system 28 may be any microprocessor-based device operating in accordance with a program or instructions which utilizes identification device 9 to obtain biometric data via sensor array 10 as needed for identification (e.g., verification and/or enrollment) of biometric data. Such computer system 28 uses biometric data connected from the sensor to enable biometric feature or identifier matching in accordance with a database or memory within system 28, or accessible to system 28. For example, computer system 28 may be part of portable identification device, point of transaction system, or any other device requiring secure biometric sensing to enable access to physical and/or electronic resources.

Identification device 9 is operable in a fingerprint imaging mode, and a three-dimensional subcutaneous tissue structure imaging mode, as described below.

Fingerprint Imaging Mode.

Figure 4:
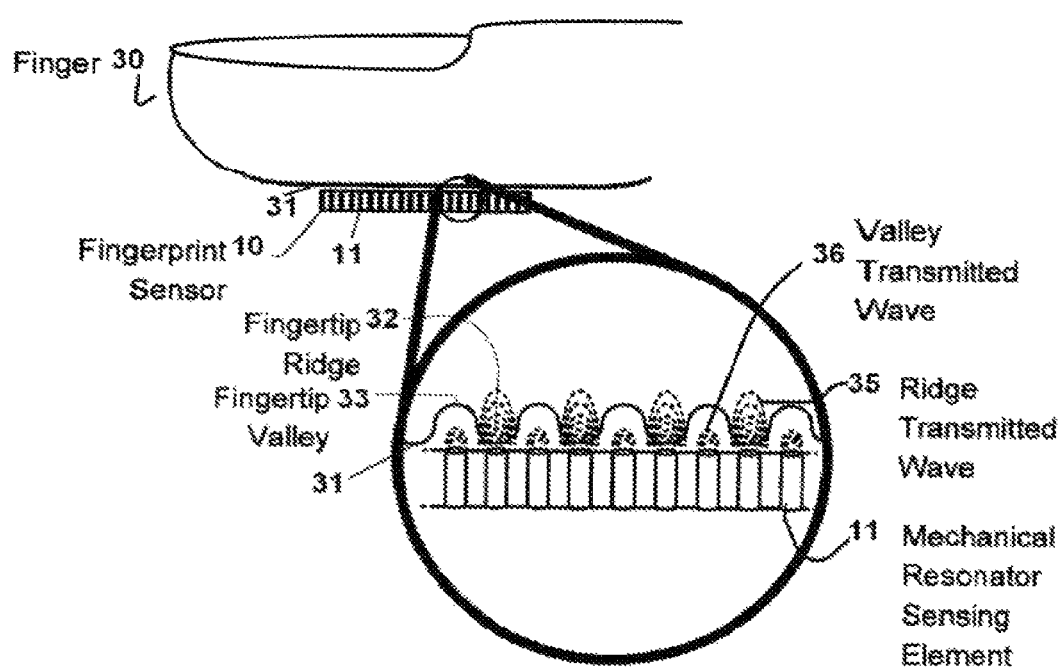
FIG. 4 illustrates a cross-section of sensor array 10 and of a finger 30 placed proximate to an upper surface of the sensor array so that the finger's surface 31 is in direct contact with its protective shield 23.

FIG. 4 illustrates a cross-section of sensor array 10 of the device 9, and a finger 30 placed proximate to the sensor array so that the finger's surface 31 is in direct contact with its protective shield 23. The finger's Such surface 31 has ridges 32, which make such direct contact, and valleys 33 which do not make such direct contact with the protective shield 23. When an element 11 is driven at a resonant frequency by the input signal generator 12, via one of transmit electrodes 19 selected by mux controller 16 via multiplexor 15a, its oscillation is directed or transmitted towards the finger's surface 31 and produces a sonic wave either towards ridges 32 or valleys 33 as graphically illustrated by sonic waves 35 and 36, respectively. The input signal excites elements 11 within the sensor array 10 and causes these elements to oscillate, preferably at a resonant frequency. Phenomena outside of the sensor array 10, such as a presence of acoustic impedance or a reflection of acoustic energy off of outside entities (external to the sensor), further influences the motion of these elements 11 (apart from the influence of input signal excitation) within the sensor array 10. Such outside influenced motion is monitored, measured and analyzed by electronic hardware in combination with software that controls operation of the electronic hardware. (See FIG. 12)

The surface 31 response to sonic wave differs due to contact to tissue of a ridge versus non-contact of valley difference in impedance (or attenuation/voltage) which is detectable by the same element 11 which transmitted the sonic waves or beam, via one of receive electrodes 20 selected by mux controller 16 via multiplexor 15b, thereby providing a measure as to whether the element is facing a ridge or a valley. The processor 12 builds a map in memory 14 where each element response (output signal) detected by processor 12 represents one pixel of the two-dimensional fingerprint image in memory 14, where each pixel may be represented as a black or white value to represent a ridge or valley, respectively, or vice versa. Thus, read out in which of impedance measured is converted into a fingerprint image of ridges and valleys.

Such operation of identification device 9 to obtain a fingerprint image is described in more detail in connection with FIGS. 17-22 of in incorporated U.S. Pat. No. 7,141,918 which is included in Appendix A of the prior filed provisional patent application, or other U.S. Pat. Nos. 7,489,066, 7,514,842, 8,331,633, and 8,335,356 which are also all herein incorporated by reference.

Preferably, sensor array 10 operates to obtain a fingerprint by detecting the impedance at a resonant frequency of an applied input signal generated 12, via multiplexor 15a, where upon soon after a driving input signal of each element 11 ceases in time, and an output signal is read from that same pixel. That output signal is representative of impedance. In other words, the element 11 ring (vibration) characteristic causes an electrical output signal to be produced by the element that when sampled, via multiplexor 15b, provides a measure of impedance. Further, two impedance measurements can take place at two different frequencies (e.g., 19.8 MHz and 20.2. MHz) for each element 11, where the difference of measured impedance at each frequency is used to determine whether the element 11 is facing and adjacent to a ridge or a valley as described in incorporated U.S. Pat. No. 7,141,918.

Ultrasound (Pitch/Catch) Three Dimensional Imaging Mode.

Identification device 9 can also operate sensor 10 in a pitch/catch imaging mode to obtain three-dimensional ultrasound images within a finger presented to sensor array 10. Thus, a sensor principally described for fingerprint image capture can enable viewing of structures within the same tissue that provided a fingerprint image, such as vascular structures (venous and arterial vessels), or bone structure. As described in more detail below, processor 13 operates the elements 11 of the sensor array 10 in this pitch/catch mode by connecting the transmitter and receiver in series, rather than in parallel as in echo imaging of the prior incorporated U.S. Pat. No. 7,141,918.

Figure 5:
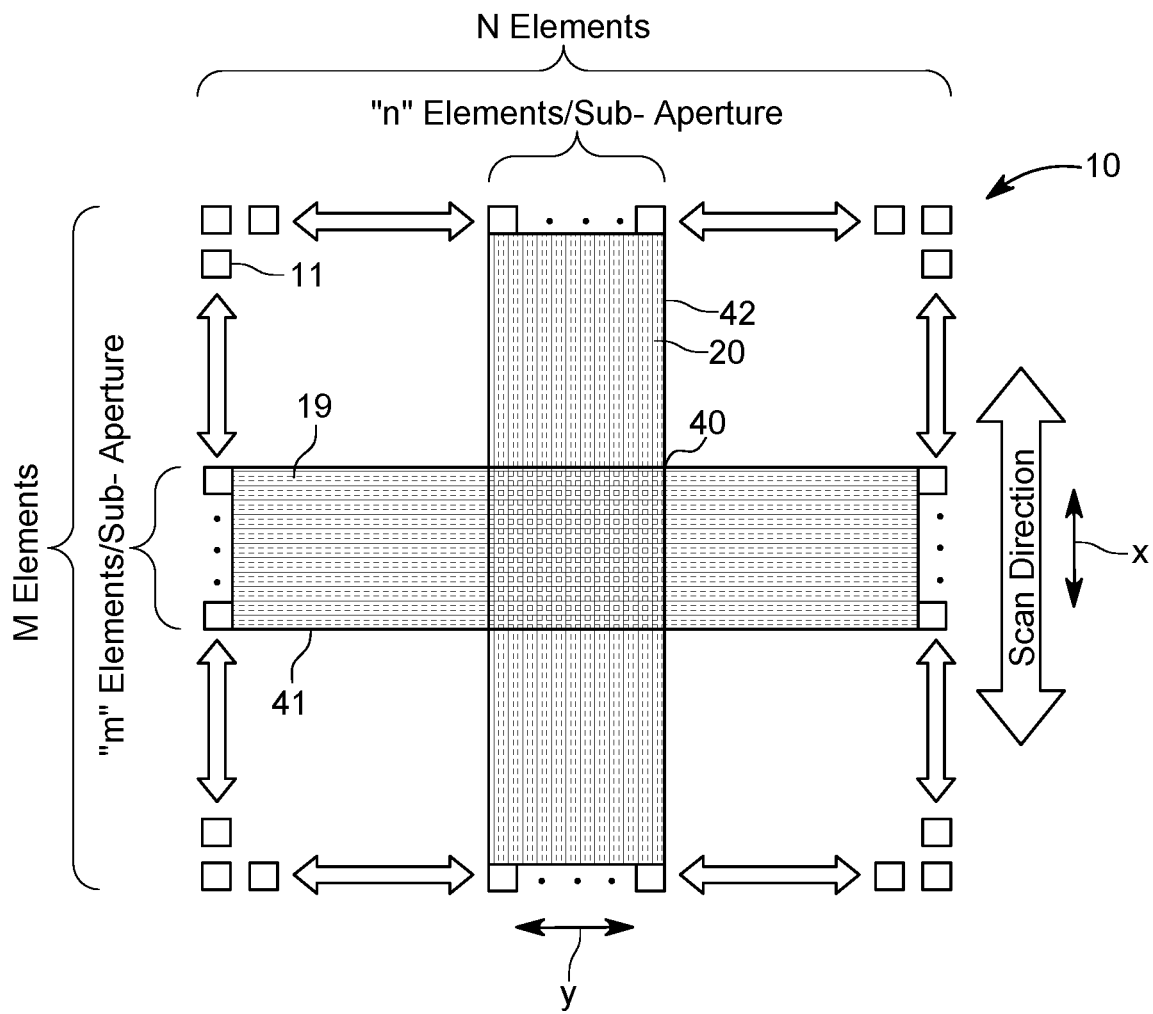
FIG. 5 illustrates a scan aperture 40 that is scanned by processor 13 with respect to an x axis (M rows) and y axis (N columns) dimensions of the scan aperture, like shown in FIG. 2.

As illustrated in FIG. 5, an scan aperture 40 is scanned by processor 13 along in x and y axes or dimensions, where the x dimension corresponds to the 1 to M rows, and y dimension corresponds to the 1 to N columns of FIG. 2. The scan aperture 40 is formed along the intersection of a group of "m" number of adjacent rows of elements 11 activated by processor 13 to provide a transmit aperture 41 that produces a transmit beam, and a group of "n" number of adjacent columns of elements 11 activated by processor 13 to provide a receive aperture 42 that receives a receive beam, where the time delay of signals received is representative of structure(s) in the volume of tissue into which the transmit beam is focused and the receive beam is received above scan aperture 40.

During scanning, processor 13 moves the scan aperture 40 along the x and y dimensions by selecting different groups of "m" rows and "n" columns in which to overlap and form different scan apertures 40. For beam focusing, the transmit electrodes 19 to the "m" rows of elements 11 are divided equally into "p" number channels, where the number of transmit channels equals "m" divided by "p". Similarly, the receive electrodes 20 the "n" columns of elements 11 are divided equally into "r" number of receive channels, where the number of receive channels equals "n" divided by "r". An example for one of the multiple scan apertures 40 that may take place during scanning of vasculature within the tissue above sensor array 10 during scanning of multiple different scan apertures is shown in FIGS. 6A and 6B, where FIG. 6A represents a transmit cycle and FIG. 6B represents a receive cycle.

Figures 6A, 6B:
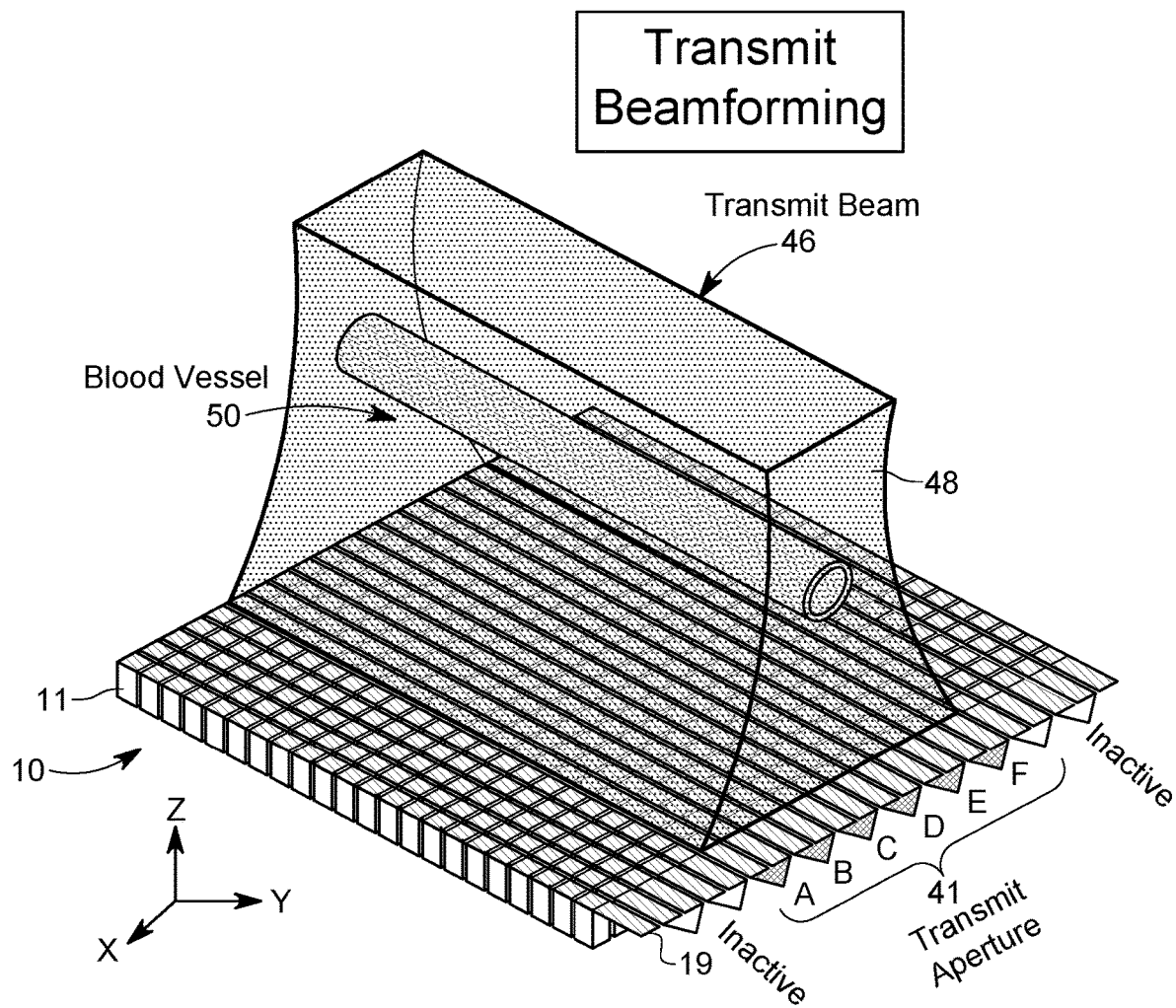
FIG. 6A illustrates a transit aperture 41 that is selected by processor 13 to form a transmit beam or pulse 46 (shown as a translucent volume) having an hour-glass shape, having 6 transmit channels.
FIG. 6B illustrates transmit signals traveling via channels A-F.

In FIG. 6A a transmit aperture 41 is selected by processor 13 to form a transmit beam or pulse 46 (shown as a translucent volume) having an hour-glass shape. In this example, "m" equals 12 and "p" equals 6, resulting in 6 transmit channels A-F each with two rows. In order to focus the beam along a volume 48 of the transmit beam 46 at a distance below the tissue surface, the transmit (input) signal is applied by transmit channels A-F and offset in time in accordance with distance of rows from a location in volume 48. The transmit signal is first applied to rows of the most outer transmit channels A and F first, then the second most outer transmit channels B and E, and then the central most transmit channels C and D last, as illustrated in FIG. 6B.

Thus the transmit aperture 41 forms a transmit beam 46 which will arrive at approximately the same time thereby focusing transmit beam 46 at locations in the intended volume 48 that may contain the object or structure of interest, such as a blood vessel 50. In forming transmit beam 46 all other rows of elements 11 which are not used in the transmit aperture 41 are inactive. A blood vessel may or may not be fully included in the transmit beam 46. During this transmit cycle, switch 27 is switched to ground by processor 13 to ground the receive electrodes 20, while switch 26 is not set to ground.

After transmit beam 46 is launched into the tissue of the finger 30 and an additional period for ring down of the transmit electrodes 19 transmitting elements 11 along the "m" rows (i.e., their electrodes 19) are switched to ground by processor 13 via switch 26, and while switch 27 is not set to ground. The receive cycle can then begin.

FIG. 7A shows an example of the receive aperture 42 selected by processor 13 to receive beam or pulse 49 having an hour-glass shape. In this example, "n" equals 12 and "r" equals 6, resulting in 6 receive channels A-F each with two columns. In order to focus receiving beam along a volume 52 beam the tissue surface, the receive (output) signal is read (or detected) from receive channels A-F, and read offset in time in accordance with distance of columns from a location in volume 52. The receive signal is first read from columns of the most outer receive channels A and F first, then the second most outer receive channels B and E, and then the central most receive channels C and D last, as illustrated in FIG. 7B.

Thus the beam received by elements 11 of the receive aperture 42 will arrive at approximately the same time from the intended volume 52, which in this example includes part of blood vessel 50. The signals from all the receive channels A-F are aligned in accordance with the time offset of reception shown in FIG. 7B and combined by a beam former 53 in processor 13 to form a combined output signal for scan aperture 40 as shown in FIG. 8.

In receiving the output signals from receive channels A-F, all other columns of elements 11 which are not in receive aperture 42 are inactive. Receive beam 49 is orthogonal to the transmit beam 46, and it is their intersection along transmit aperture 41 and receiver aperture 42 which defines the effective pitch/catch scan aperture 40.

The processor 13 receives signal from the "n" column of elements 11 during the sampling interval associated with the round trip time after the ceased transmit beam is backscatter reflected towards the sensor 10, from the objects or structures desired to be imaged. The delay in time of the combined output signal from beam former 53 over the sampling interval represents distance from the sensor array 10, and the amplitude or value 54 of the signal at different depths along the z dimension sampled during the sampling interval is recorded by processor 13 in memory 14 at x,y,z coordinates associated with that scan aperture 40. The processor 13 may receive combined output signal over the entire depth of the scan aperture 40, but records information in memory 14 over a desired range of volume's depth of intersecting volumes 48 and 51 of scan aperture 40 to provide a three-dimensional ultrasound image indicating structures of interest which can be within that desired depth range from sensor array 10.

FIG. 8 shows an effect upon a beam formed signal by a blood vessel 50 along the z axis at a distance from sensor 10 centered along the scan aperture 40, where +/−amplitude value 54 of coordinate along the x axis at a common y position centered about the receive aperture 42. (The amplitude of the signal between the outer boundaries of the vessels diameter may also be processed by processor 13 to provide velocity information of the flow there through at that x, y coordinate for use as a vital parameter). In other words, this transmit beam 46 is steered in two orthogonal axes x and y within a two-dimensional (2D) scan of the sensor array 11. The 3rd axis, defined as the axial or z-axis is obtained by time of arrival analysis of subcutaneous tissue causing backscattered sound waves by processor 13.

The processor adds the information at sampled points of amplitude 54 obtained along the z axis from sensor 10 at the x,y coordinate to a map in memory 14 along the x and y dimensions thereby building a three-dimensional ultrasound image of subcutaneous structures. A full 20 x,y image along an x,z plane is obtained from time history in z and receive aperture 42 position in y. In other words, this 20 image provides a slice along the x,z plane of the full 3D volume presentation of backscattered ultrasound for a given scan aperture 40. Scanning along the x axis while scanning the receive aperture for each new position creates the full volume representation of the fingertip object. During this receive cycle, switch 26 is switched to ground by processor 13 to ground the transmit electrodes 19, while switch 27 is not set to ground.

The processor 13 then repeats the process for different scan apertures 40 along the x any y dimensions over the volume of tissue above sensor array 10 providing multiple slices along x,z planes of scan apertures to complete a three-dimensional ultrasound image of subcutaneous structures.

Three-dimensional beam forming for ultrasonic imaging is described in C. E. Demore et al., Real Time Volume Imaging Using a Crossed Electrode Array, IEEE UFFC Trans vol. 56 (6) 1252-1261, but heretofore has not been provided by a sensor array of piezoelectric elements.

Figure 9:
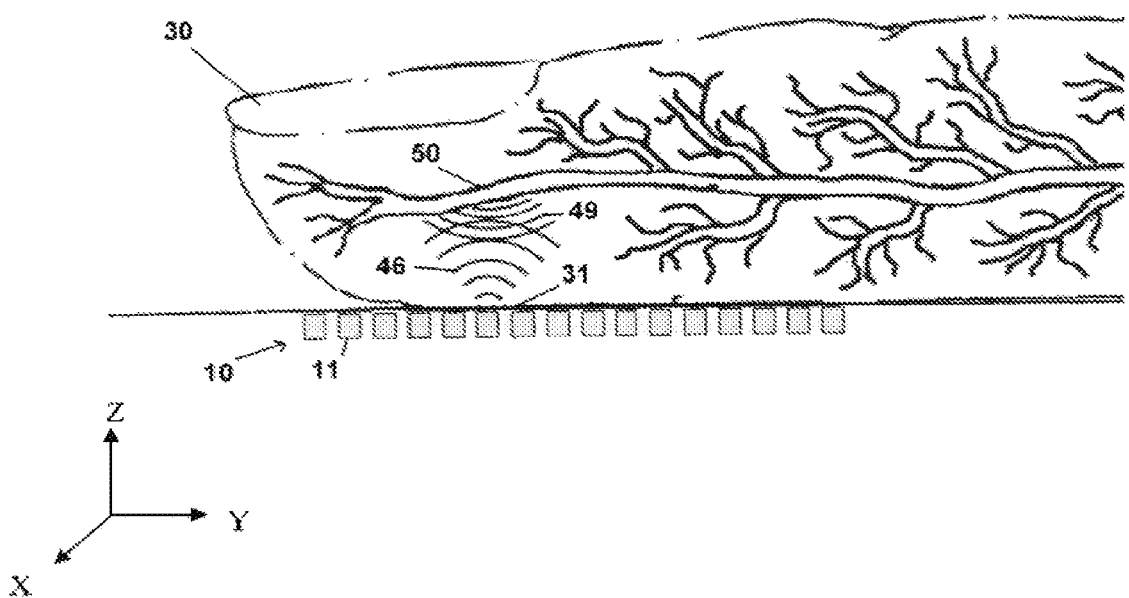
FIG. 9 illustrates ultrasound scanning of a blood vessel 50 within a finger via a sensor array.
Figure 10:
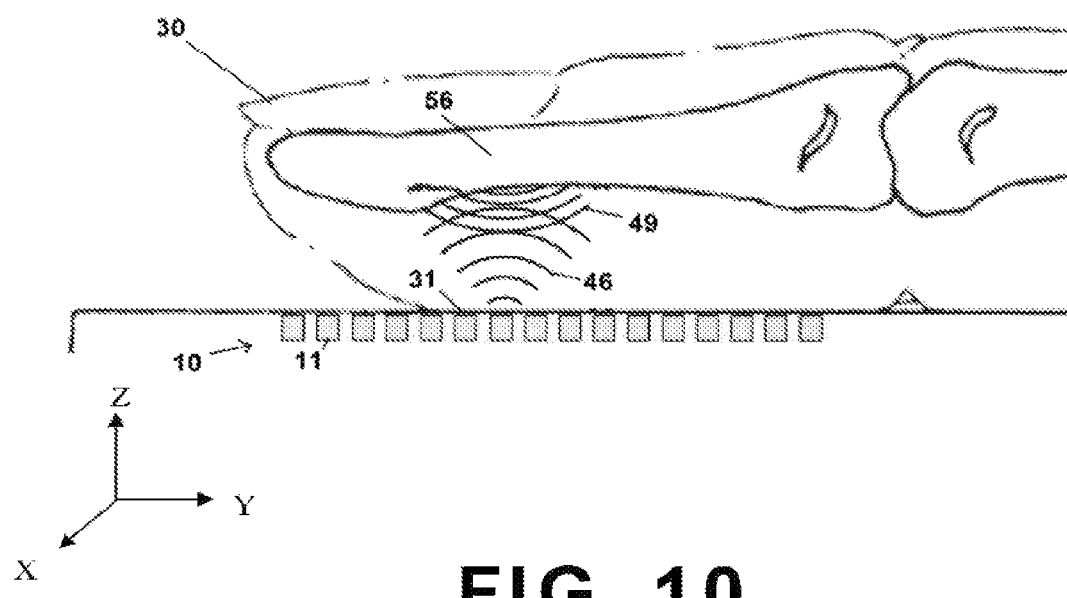
FIG. 10 illustrates ultrasound scanning of a bone structure within a finger via a sensor array.

As describe above, there is grounding of transmit electrodes 19 and receive electrodes 20 alternating with receive and transmit cycles for each scan aperture 40. As vascular structures and bone structures are at different depths in the tissue with respect to sensor 10, the sampling interval for the subcutaneous tissue may be set to provide three-dimensional ultrasound image of the vasculature of finger 30 as illustrated in FIG. 9, or bone structure of finger 30 as illustrated in FIG. 10, thereby enabling three-dimensional imaging of different types of subcutaneous structures. Other structures in the tissue of the finger may similarly be imaged as desired.

Unlike in fingerprint mode where only one transmitting element 11 is used at a time, in the ultrasound pitch and catch mode a subgroup of "n" adjacent transmitters (transmitting elements 11) is active providing an electronically focused beam 46 in one lateral direction commonly referred to as azimuth axis. In the orthogonal direction, commonly referred to as the elevation direction, the receive aperture 49 is selected as a sub-group of "m" electrodes 20 via the multiplexer 15b, thus the effective aperture for transmit and receive becomes the spatial intersection between transmit and receive apertures 41 and 42, respectively. Only a subgroup "m" of the M receive electrodes 20 are connected via a multiplexer 15b to a group of "m" receive amplifiers and signal processing chains for beam formation and further backscatter analysis by processor 13.

In the fingerprint mode all available M receive channels utilized in parallel providing maximum speed for data acquisition. All electrodes are connected to a programmable signal from processor 13 to ground switches 26 and 27. Thus in the ultrasound imaging mode the receive electrodes 19 are grounded during the transmission cycle or phase, but switched off from ground (unwounded) during the receive phase during which all transmitting elements 11 are grounded.

By analyzing changes in two or more ultrasound images at a x,y,z coordinate(s) in a blood vessel, proof of life parameter(s) are detectable, such as velocity or flow of cells through the vessel, heartbeat, or flow patterns, as desired, in a manner as commonly detected in typical ultrasound imaging system.

Figure 11:
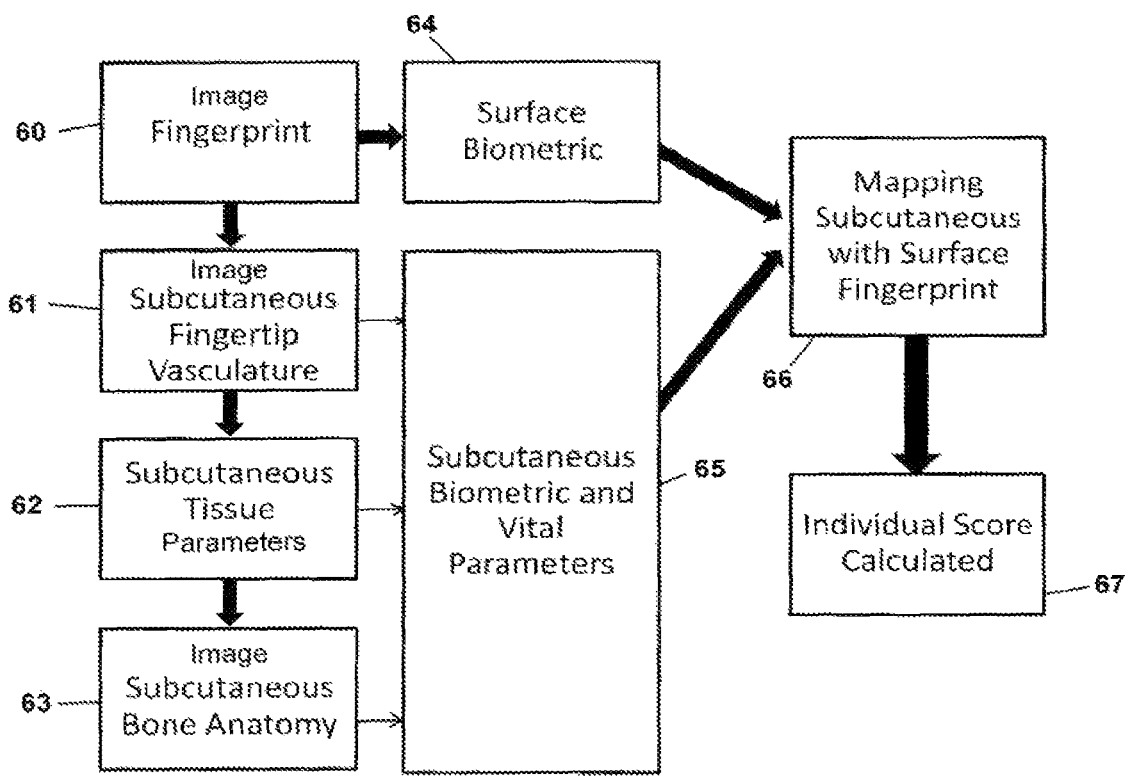
FIG. 11 illustrates operation of the identification device 9 of FIG. 3 while scanning a finger via a sensor array, like shown in FIGS. 4, 9 and 10.

Referring to FIG. 11, the operation of an identification device 9 will now be described for identification (or verification) or a subject's finger 30 as presented to sensor array as shown in FIGS. 4, 9, and 10. First, in fingerprint image mode sensor array 10 is operated processor 13 to capture an image (two dimensional representation) of a fingerprint along the surface of finger 30 (step 60), as described above, which is stored in memory 14 as minutia (biometric fingerprint identifiers) in relative and local sensor x,y coordinates (step 64). Optionally, or in addition, the fingerprint image may be stored in memory 14, and/or sent to computer system 28.

Next, identification device 9 is switched to three-dimensional ultrasound/volumetric imaging mode. An image of subcutaneous fingertip vascular structure of finger 30 is then captured in memory 14 (step 61), and processed by processor 13 to obtain biometric data of identifiers uniquely characterizing curvature and/or shape of all or major subcutaneous vascular structure of the finger in relative and local sensor x,y,z coordinates (step 65). Other tissue characteristics from image may also provide biometric identifiers, such as tissue speckle. Optionally, or in addition, the three-dimensional ultrasound image may be stored in memory 14, and/or sent to computer system 28.

At step 62, subcutaneous tissue parameters are measured from the ultrasound image stored in memory 14. The ultrasound image may be processed by processor 13 to determine elastic properties of tissue by applying pressure to the fingertip and estimating the strain in the tissue using typical ultrasound elastography. Reversely, with known tissue elasticity applied pressure is estimated from tissue strain. The elastic measure represents another biometric identifier stored in memory 14.

The processor 13 using the three-dimensional ultrasound image from step 61 stored in memory 14 determines one or more vital parameters which may be used to reduce the risk that the subject's finger in fake or dead, such as blood flow, vessel wall pulse waves and heart rate parameters. Each of the one or more vital parameters are compared with one or more thresholds stored in memory 14 (or by computer system 28 if sent thereto) which if not met indicates that the subject's finger 30 may be fake or dead. Blood flow may be identified using common procedure of ultrasonic flow detection, such as described in J. A. Jensen, Estimation of Blood Flow using Ultrasound, Cambridge University Press, 1996, or R. S. C. Cobbold, Foundations of Biomedical Ultrasound, Oxford University Press, 2007. In addition to identifying blood flow, blood mean velocity or maximum velocities as well as flow spectra are obtained. Heart rate and vessel wall motion is detected from lower frequency variations of pulsed and continuous wave ultrasound.

An image of subcutaneous fingertip bone structure is then captured and stored in memory 14 (step 63), and processed by processor 13 to obtain biometric data of identifiers uniquely identifying subcutaneous bone structure of the finger in relative and local sensor x,y,z coordinates (step 65). Finger bone structure is useful as biometric, particularly if bone curvature or other bone shape identifiers.

The identifiers of biometric data from finger print, vascular image, bone structure image, and elastic parameter, and provided along with determine proof of life parameters to computer system 28 at step 66. Computer system 28 stores a database of security identification information of previously captured identifiers of biometric data of fingers of enrolled subjects, and attempts to map the identifiers of biometric data obtained from the finger at steps 60-63 to such security identification information (step 66). A score is calculated for each attempted mapping (step 67) and when one of the mapping store exceeds a threshold level identification may be considered as being confirmed. Use of additional biometric data identifier than a finger print for a small area subcutaneous biometric image increases the probability for true acceptance and true rejection.

If the processor 13 (or computer system 28) detects that one or more of the proof of life parameters is outside their respective acceptable threshold values(s) stored in memory 14, the identification process ends and the operator of computer system 28 notified.

Optionally, or in addition, the fingerprint, and/or one or more of the three-dimensional ultrasound images of vasculature and bone structure may be stored in memory 14, and/or sent to computer system 28 for storage in its memory, Further, all or part of the processing of image(s) by processor 13 to provide biometric identifiers may be performed by computer system 28 upon such image(s) if so provided to system 28, which like processor 13 operates in accordance with a program or software in its memory enabling such operations.

To enroll a subject rather than for verification, steps 60-65 are also performed, and the biometric data from such steps is sent to computer system 29 for storage in a database of security information of computer system 28 along with other inputted identification information related to the subject, e.g., name, facial picture, department, etc., for future use in biometric identification in a manner typical of fingerprint identification systems. If the processor 13 (or computer system 28) detects that one or more of the proof of life parameters is outside their respective acceptable threshold values(s) stored in memory 14, the enrollment process ends and the operator of computer system 28 notified.

The identification device 9 may provide other imaging or vital parameter detection. For example, a very large aperture 40 unfocused beam (transmit and received channels are not time shifted) may be utilized for detecting heartbeat. From the heart beat a wavelet (time frequency pattern) may be constructed by processor 13. This wavelet is then utilized to identify areas of pulsation associated with arterial blood flow supporting biometric identification by providing temporal filtering. Further, parallel overlapping transmit and receiving beams, and non-overlapping parallel transmit and receive beams, rather than orthogonal as described above, may be used, such as useful for detecting and monitoring flow of correlation in three dimensions.

Although the scan aperture 40 is described as being fixed in size along x and y dimensions, a search for subcutaneous features using a variable aperture may be used, where areas of subcutaneous biometric is first coarsely scanned using wider beams; only identified areas by processor 13 are scanned using high resolution scanning of smaller scan apertures, such as described above in connection with FIGS. 5 to 8. Identified areas may be identified by have pixel values (or spatial distributions) above threshold value(s) indicative of possible object detection.

One or multiple ultrasound three dimensional images described herein may be analyzed using any common ultrasound analysis to provide additional biometric or medical information. Thus, application of biomedical ultrasound to the fingertip may be used for extracting anatomical, morphological and physiological properties of tissue; each one can increases the number of biometrics used for personal identification and proof of life. Ultrasound images provided from sensor 10 although described for identification may be used for medical applications in a manner as typical of ultrasound images.

Figure 12:
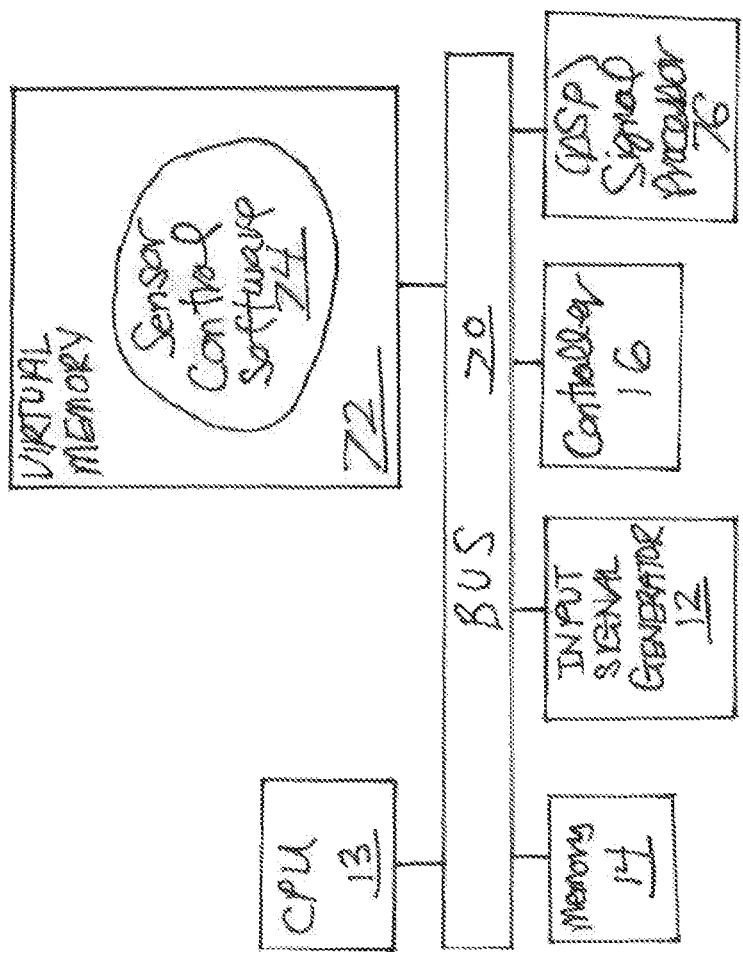
FIG. 12 is a simplified illustration of sensor control hardware and software.

FIG. 12 is a simplified illustration of sensor control hardware and software. As shown, a central processing unit (CPU) 13, also referred to herein as the processor 13, is electronically attached to a system bus 70, also referred to herein as the bus 70. Memory 14, a signal generator 12, a controller 16 and a signal processor 76 are also electronically attached to the bus and addressable by the processor 13, via the bus 70. The memory 14, represents memory implemented as one or more memory components that are addressable from the processor 13, via the bus 70. Preferably and in some embodiments, the processor 13 can address other memory components that are not necessarily electrically attached to the bus 70, and are addressable via means other than the bus 70.

Virtual memory 72, represents processor addressable and accessible memory, whether implemented as memory 14 or as other non-bus attached memory. The virtual address space 74 stores digital logic expressed as CPU instructions and processor addressable data. Sensor control software 74, is stored within the virtual memory 72, and is configured to control transmission of signals, and configured to control reception of signal from, the sensor array 10 via the processor 13, the controller 16, the signal generator 12 and the signal processor 76.

In some embodiments, the controller 16 interfaces with multiplexors ("muxes"), like the multiplexors 15a-15b shown in FIG. 1A. Because the processor also interfaces with the controller 16 via the bus 70, the sensor control software 74 via the processor 13, also exercises control of the multiplexors 15a-15b, via the controller 16.

Figure 13:
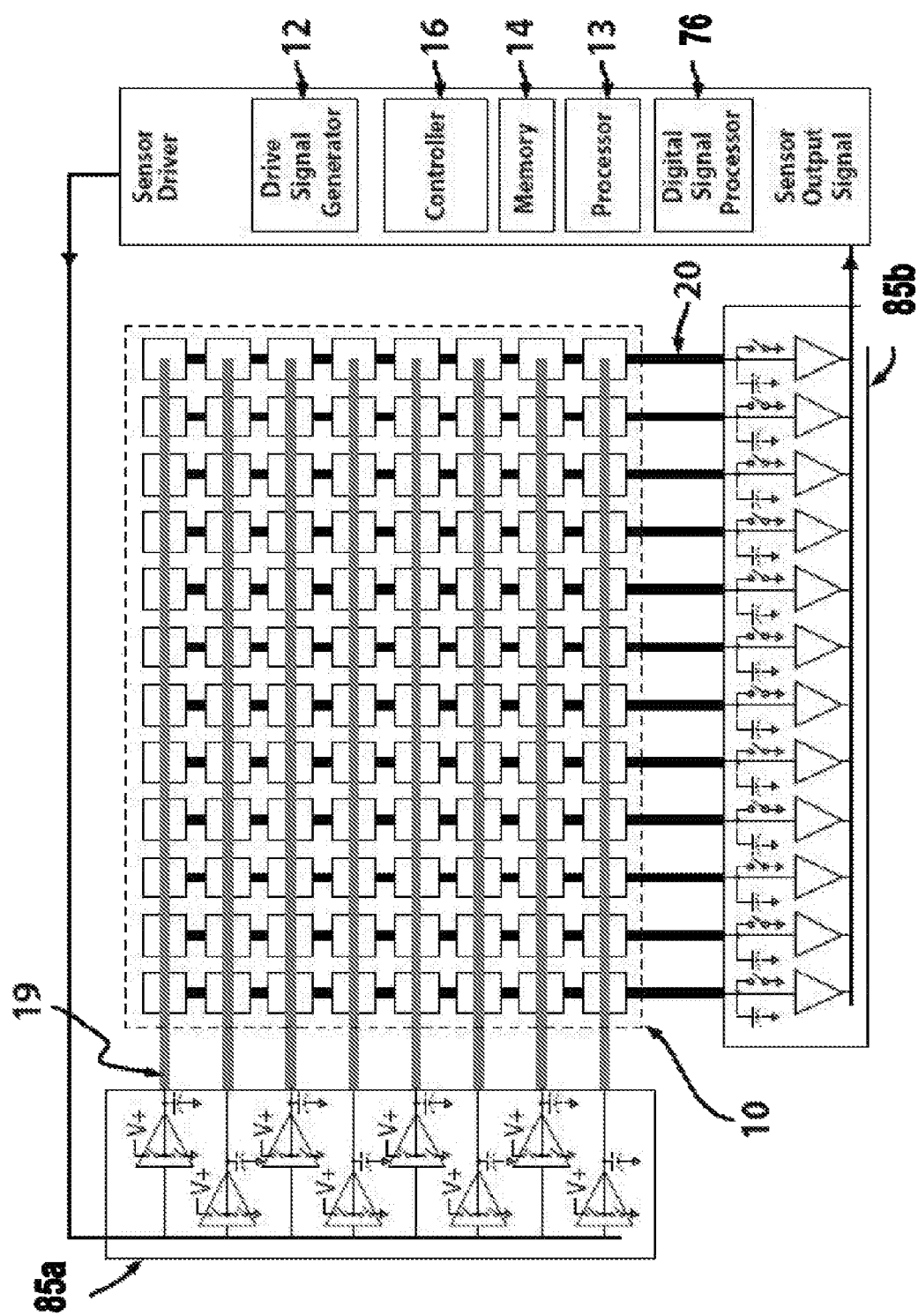
FIG. 13 illustrates an alternative hardware for transmitting and receiving signals to and from the sensor array.

In other embodiments, as shown in FIG. 13; the controller 16 interfaces with non-multiplexor based hardware, to transmit and receive signals to and from the sensor array 10. Because the processor also interfaces with the controller 16 via the bus 70, the sensor control software 74 via the processor 13, exercises control of the non-multiplexor based hardware via the controller 16.

The sensor control software 74 is configured to operable in a first mode for obtaining a first set of data encoding at least one two dimensional image of a fingerprint of a finger. The software 74 is also configured to be operable in a second mode for obtaining a second set of data encoding at least one three-dimensional representation of one or more subcutaneous tissue structures that are located within tissue that is embedded within a finger.

Further, the software identifies biometric information, such as biomarkers, within both the fingerprint and subcutaneous tissue that is embedded within the finger. Besides minutia, other biomarkers include a nearest three dimensional coordinate of a vascular structure, or a bone structure, relative to one selected fingerprint minutia location. The relative location between these biomarkers are represented by three dimensional Cartesian coordinates. In other embodiments, other metrics, such as those employing angles and distances, are employed to quantify a relative location between biomarkers within a fingerprint, within subcutaneous tissue and/or between a fingerprint and subcutaneous tissue.

With respect to vascular and bone structures, location coordinates of points along an outer surface and/or a center point along an intersecting plane to the vascular or bone structure, are determined and recorded as a biometric marker.

In some embodiments, after an initial mapping of biomarkers within a vascular subcutaneous structure, a second, third and possibly a fourth mapping of one or more biometric markers over time, to identify dynamic properties of portions of subcutaneous tissue.

For example, locations of biomarkers that change over time, such as those associated with the vascular structure can be recorded and analyzed to determine a pattern of motion indicative of a presence and/or frequency of a heart beat and to optionally determine an amount of blood flow or a pulse wave pattern through the vascular structure, Such analysis can also determine elastic properties, such as an expansion and contraction measurement of the vascular structure.

Aside from measurement of dynamic properties of biometric markers within subcutaneous tissue, a static representation of less dynamic, and relatively static biometric markers within the finger print and subcutaneous tissue are measured and combined to represent an overall static biometric characteristic of a person, for which is employed for later comparison with biometric information later obtained from an unidentified person, to perform biometric matching.

In some embodiments, biometric matching involves computation of a matching score. If such matching score equals or exceeds a minimum score value, then an identity match has occurred and as a result, it is highly likely that a person currently having an un-proven identity, is a person from which biometric data has been previously obtained from and registered and later matched in association with the system of the invention.

Likewise, if such a matching score is less than a minimum score value, then an identity match has not occurred and as a result, it is not likely that a person currently having an non-proven identity, is a person from which biometric data has been previously obtained from and registered in association \with the system of the invention.

FIG. 13 illustrates an alternative hardware for transmitting and receiving signals to and from the sensor array 10. A schematic diagram of a top down view of a piezoelectric identification device, according to an alternative embodiment of the present invention is shown.

As shown, multiplexors 15a-15b are replaced with non-multiplexor based electronic hardware components 85a-85b, respectively. The component 85a, includes CMOS drivers and is configured for facilitating transmission of signals from the signal generator 12 to the elements 11 of the sensor array 10. Use of multiplexors adds significant and unwanted capacitance, which degrades use of the sensor array 10 when generating ultrasound acoustic energy from the sensor array 10.

The non-multiplexor based electronic hardware 85a, instead employs CMOS drivers for periodically switching the transmission of signals to the sensor array 10, instead to a ground potential, when the component 85b, is receiving signals from the sensor array 10. Likewise, the non-multiplexor based electronic hardware 85b, instead employs pre-amplifiers for receiving signals and periodically switching the reception of signals from the sensor array 10, to a ground potential, when the component 85a is transmitting signals to the sensor array 10.

In other words, the receiving (Rx) lines 20 are clamped to ground during signal transmission over the (Tx) lines 19, and the transmitting (Tx) lines 19 are clamped to ground while receiving signals over the (Rx) lines 20. This allows for a ground potential clamping multiplexor (mux) on low impedance receiving (Rx) lines during the signal transmission (Tx) sequence and for controlling the transmission (Tx) driver to clamp the transmission (Tx) tines during the signal receiving sequence. Hence, although such a clamping multiplexor (mux) can be employed within 85a-85b, these components 85a-85b are substantially implemented from non-multiplexor electronic hardware components, and as a result, are referred to herein as non-multiplexor based hardware.

In other embodiments, H-bridge transmission drivers can be employed, by changing the receive (Rx) clamping multiplexor (mux) to an inverse polarity driven transmission (Tx) driver. In this type of configuration, the second transmission (Tx) driver on the (Rx) lines would be placed into a tri-state during signal (Rx) reception, while the opposite transmission (Tx) driver would clamp to ground potential.

From the foregoing description it will be apparent that there has been provided an improved biometric sensing devices, and systems and methods using same for biometric identification. The illustrated description as a whole is to be taken as illustrative and not as limiting of the scope of the invention. Such variations, modifications and extensions, which are within the scope of the invention, will undoubtedly become apparent to those skilled in the art This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:
1. A sensor comprising:
an ultrasonic sensor array including sensing elements;
a control unit configured for controlling, with respect to a position in a 3D space associated with a finger of a person in physical contact with the sensor:
   a first set of transmitting sensing elements of the ultrasonic sensor array for transmitting ultrasonic signals to the finger, wherein transmission of the ultrasonic signals from at least two transmitting sensing elements of the first set are offset in a first time interval such that the ultrasonic signals from the at least two transmitting sensing elements arrive at the position at approximately a same time, and
   a second set of receiving sensing elements of the ultrasonic sensor array for receiving amplitude signals caused by redirection of the ultrasonic signals received by the finger at the position, wherein reception of the amplitude signals by at least two receiving sensing elements of the second set are offset in a second time interval such that the amplitude signals arrive at the at least two receiving sensing elements at approximately a same time; and
a 3D representation forming unit configured for obtaining a three-dimensional representation of a subcutaneous structure inside the finger based on the amplitude signals received at respective receiving times.

2. The sensor of claim 1, wherein the offset in the first time interval is in accordance with a distance between the at least two transmitting sensing elements and the position in the 3D space.

3. The sensor of claim 1, wherein the offset in the second time interval is in accordance with a distance between the at least two receiving sensing elements and the position in the 3D space.

4. The sensor of claim 1, wherein the amplitude signals and their respective receiving times are reflective of the subcutaneous structure and at least one parameter thereof.

5. The sensor of claim 1, wherein the control unit is configured for controlling a first set of electrical connections with respect to the transmission of the ultrasonic signals and a second set of electrical connections with respect to the reception of the amplitude signals.

6. The sensor of claim 5, wherein the first set of electrical connections is orthogonal to the second set of electrical connections.

7. The sensor of claim 1, wherein a first set of the amplitude signals corresponding to 3D positions of a boundary of the subcutaneous structure is greater than a second set of the amplitude signals corresponding to a 3D position internal or external to the subcutaneous structure.

8. The sensor of claim 1, wherein the control unit configured to operate the ultrasonic sensor array in a first mode or a second mode, wherein
   in the first mode, the control unit is configured to obtain a two-dimensional representation of the finger based on acoustic energy transmitted and received by the sensing elements of the ultrasonic sensor array, and
   in the second mode, the control unit is configured to obtain the three-dimensional representation.

9. The sensor of claim 1, wherein the subcutaneous structure is a bone structure within the finger.

10. The sensor of claim 1, wherein the subcutaneous structure is a vascular structure within the finger.

11. The sensor of claim 1, wherein the three-dimensional representations of the subcutaneous structure are used to determine a dynamic property of the subcutaneous structure.

12. The sensor of claim 1, wherein the dynamic property includes an elastic property of the subcutaneous structure.

13. The sensor of claim 1, wherein the dynamic property is used to determine liveness of the person.

14. The sensor of claim 13, wherein the dynamic property is used to measure a heartbeat.

15. The sensor of claim 13, wherein the dynamic property is used to measure a blood flow through a vascular structure.

* * * * *